United States Patent [19]

Van Doorn et al.

[11] Patent Number: 5,408,365
[45] Date of Patent: Apr. 18, 1995

[54] RECORDING DEVICE WITH TEMPERATURE-DEPENDENT WRITE CURRENT CONTROL

[75] Inventors: Rudolf A. Van Doorn; Franciscus J. R. Verhallen, both of Eindhoven, Netherlands

[73] Assignee: U.S. Philips Corporation, New York, N.Y.

[21] Appl. No.: 222,041

[22] Filed: Apr. 4, 1994

[30] Foreign Application Priority Data

May 10, 1993 [BE] Belgium ............................ 09300477

[51] Int. Cl.⁶ .................................................. G11B 5/09
[52] U.S. Cl. ........................................ 360/46; 360/67; 360/66
[58] Field of Search ................ 360/113, 46, 67, 68, 360/66, 65

[56] References Cited

U.S. PATENT DOCUMENTS

| | | | |
|---|---|---|---|
| 3,806,828 | 4/1974 | Johnson | 360/68 X |
| 4,230,158 | 7/1981 | de Niet | 360/113 |
| 4,879,610 | 11/1989 | Jove et al. | 360/67 |
| 5,101,310 | 3/1992 | Brown | 360/68 |
| 5,150,073 | 9/1992 | Murari et al. | 360/68 X |

FOREIGN PATENT DOCUMENTS 60-143404 7/1985 Japan ...................................... 360/46

OTHER PUBLICATIONS

Jorgensen, "The complete handbook of magnetic recording", 3rd Edition, pp. 295-296.

*Primary Examiner*—Donald Hajec
*Assistant Examiner*—Thien Minh Le
*Attorney, Agent, or Firm*—Brian J. Wieghaus

[57] ABSTRACT

A device for recording an information signal on a magnetic record carrier comprises a recording amplifier (3), a magnetic head (4), and a controller for controlling the write current amplitude in dependence on temperature variations which occur during recording. This is effected by a temperature detector. The magnetic head (4) has a write section (5) for recording an information signal on the magnetic record carrier in a recording mode of the device, and a read section (6) for reading an information signal from the record carrier in a playback mode of the device. The read section (6) is of the magneto-resistive type. The temperature detector is formed by the read section.

11 Claims, 2 Drawing Sheets

RECORDING DEVICE WITH TEMPERATURE-DEPENDENT WRITE CURRENT CONTROL

BACKGROUND OF THE INVENTION

The invention relates to a device for recording an information signal on a magnetic record carder, which device comprises an input terminal for receiving the information signal, a recording amplifier having an input coupled to the input terminal and having an output coupled to an input of a magnetic head, which recording amplifier is adapted to drive a magnetic head with a write current of given amplitude, and compensation means for controlling the amplitude of the write current in dependence upon temperature variations which occur during recording, which compensation means include temperature detection means.

Such a device is known from Japanese Kokai 60-143.404.

The compensation means in the known device comprises a temperature detector arranged close to the magnetic head. The temperature detector detects the temperature in the vicinity of the magnetic head and generates a control signal whose magnitude is a measure of this temperature. The compensation means subsequently controls the write current amplitude in dependence upon the control signal so as to obtain a constant magnetisation level in the record carrier at varying temperature.

For a given write current amplitude the recording depth of the information signal in the record carrier during recording appears to be dependent on the temperature of the record carrier. A varying temperature consequently results in varying recording depths. A higher temperature generally leads to a larger recording depth, cf. Finn Jorgensen: "The complete handbook of magnetic recording", 3rd. edition, pp. 296/6.

Preferably, the recording level of a recording should be as constant as possible and have a given value. This is of particular importance for apparatuses which do not have an erase head and which make a new recording by overwriting the old recording. If the recording level of the old recording in the record carrier is not constant problems may arise in the sense that sometimes the old recording cannot be overwritten satisfactorily. This problem is of particular importance for the compatibility of record carriers if a record carrier on which an old recording has been made is to be overwritten by means of another recording device not having an erase head. This means that the afore-mentioned requirement of a recording depth which is as constant as possible applies both to devices with an erase head and devices without an erase head.

If this requirement is not met and a new recording is made over an old recording in devices without an erase head this new recording cannot be read satisfactorily during subsequent reproduction. If during recording the write current amplitude is now corrected for these temperature variations the desired recording depth can be obtained during the entire recording, with an adequate overwriting attenuation, so that a satisfactory read quality of the newly recorded information is attainable. In practice, the constancy of the recording depth obtained during a recording appears to be unsatisfactory in some cases.

SUMMARY OF THE INVENTION

It is an object of the invention to provide a device having an improved temperature-dependent write current control.

According to the invention this object is achieved inter alia in that the magnetic head has a write section for recording the information signal on the magnetic record carrier in a recording mode of the device, and a read section for reading an information signal from the magnetic record carrier in a playback mode of the device, which read section is of the magneto-resistive type and comprises a magneto-resistive element, and in that the temperature detection means comprise the read section of the magnetic head.

The magnetic head has a read section of the MRH type and a write section in the form of an inductive coil having 1 or more turns. The information is written into the record carrier by means of the inductive coil.

The invention is based on the recognition of the fact that the read section of such a magnetic head can be used as a temperature sensor. More specifically, the magneto-resistive element of this read section can be used as a temperature sensor, the (variations in the) resistance value of the MR element being a measure of the temperature (variations) in the record carrier.

The MR element of the read section of the MRH type used in the device exhibits a generally undesirable temperature sensitivity. The invention makes advantageous use of this undesirable behaviour. Indeed, the resistance value of the MR element depends strongly on the temperature of the magnetic head. Therefore, since the magnetic head is in contact with the record carrier the temperature of the magnetic head is a measure of the temperature of the record carrier. The resistance value of the MR element can thus be measured and is a measure of the temperature of the record carrier. It is thus possible to derive from the measured resistance value a control signal which enables the write current to be controlled correctly.

For the temperature measurement use could be made of the read section which reads the information from the same track in which the write section writes the information. This yields a very accurate measurement of the temperature of the record carrier at the location of recording by the write section. A disadvantage is that this may give rise to cross-talk of information recorded by the write section to the read section, which could possibly disturb the temperature measurement by the read section.

A reduction of this cross-talk can be obtained by using another read section of the magnetic head for the temperature measurement. This other read section co-operates with a second track, which is another track than the first-mentioned track in which the information is recorded by the write section. This second track should then be a track in which no information is recorded at the instant at which the write section records the information in the first-mentioned track. To this end the read section could be a read section associated with a track on the other side of the record carrier than that on which a recording is being made by the write section. Consequently, since no information is recorded in this other track, there will be less cross-talk to this read section.

For a correct temperature measurement by means of the read section it is important that the write section is incorporated in one constructional unit, integrated with the read section used for the temperature measurement. Integration of the write section and the read section in one constructional unit means, for example, that the write section and the read section are secured to one another in a mechanically rigid manner by gluing. Integration to one constructional unit is also possible by fabricating both sections in the same (thin-film) technology. This integration provides a proper thermal contact in the magnetic head between the area of the write section and the area of the read section, so that the temperature of the read section is yet a correct measure of the temperature of the record carrier at the location where writing takes place.

The invention leads to an improved recording depth. Moreover, the step has the advantage that no separate temperature sensor is required but that use is made of a read section already present in the magnetic head, which makes the device cheaper.

Another advantage is that a correct recording depth is obtained even just after insertion of record carriers at a deviating temperature and in spite of the intrinsic dissipation of the magnetic head.

BRIEF DESCRIPTION OF THE DRAWINGS

Some exemplary embodiment of the invention will be described in more detail hereinafter with reference to the drawings. In the drawings

DESCRIPTION OF THE PREFERRED EMBODIMENTS

Figure 1:
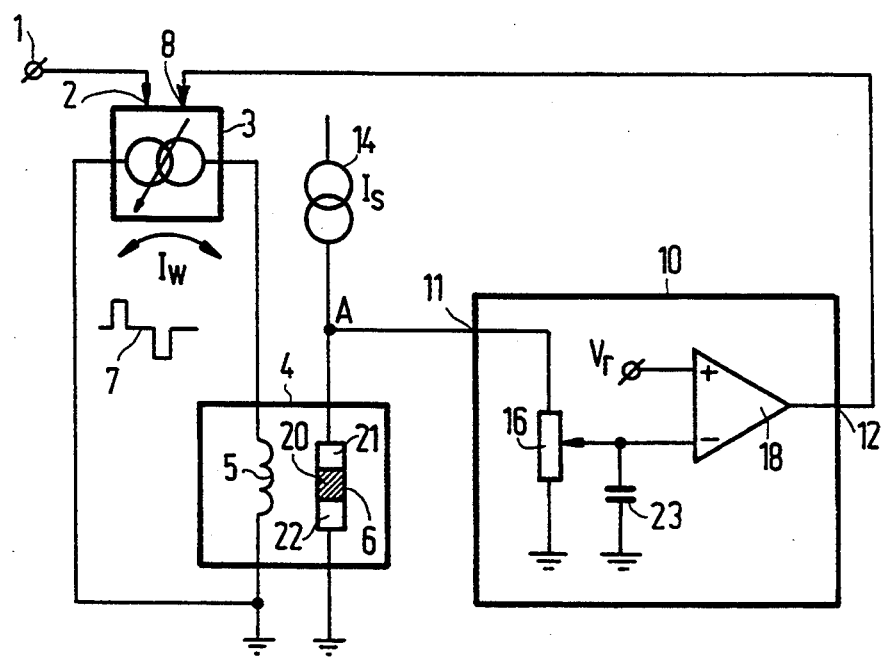
FIG. 1 shows an embodiment of the device.

FIG. 1 shows an embodiment of the device, having an input terminal 1 for receiving an information signal, for example a digital information signal to be recorded on a record carrier (not shown). The information signal is applied to an input 2 of a recording amplifier 3, which supplies the information signal to a magnetic head 4 as a write current having a certain amplitude $I_w$. The magnetic head 4 has a write section 5 in the form of an inductive coil having one or more turns, and a read section 6. The read section 6 is of the MRH type. For recording the digital information signal write-current pulses, see the signal referenced 7, are applied to the coil, which pulses have a first polarity (for example positive) or a second polarity (negative) depending on the value of the information signal. The amplitude of the write-current pulses can vary in dependence upon a control signal applied to the recording amplifier 3 via a control signal input 8.

The device comprises compensation means 6, 10 for controlling the write current in dependence upon temperature variations which occur during recording. The compensation means include temperature-detection means in the form of the read section 6 of the magnetic head 4. The read section 6 is represented only diagrammatically by the magneto-resistive element, shown as a hatched portion 20, and the electrical connections 21 and 22 of this element. The connection 21 of the element 20 is coupled to an input 11 of a control signal generator 10. The connection 22 is coupled to a point of constant potential (earth).

The control signal is available on an output 12 of the control signal generator 10 and is applied to the control signal input 8 of the recording amplifier 3.

A current source 14 supplies a measurement current $I_s$ to the MR element 20 of the read section 6. This measurement current is the same current as applied to the element 20 if the read section 6 is used in the read mode. The resistance value of the MR element 20 produces a voltage on the input 11. A temperature variation of the record carrier and hence of the magnetic head and, consequently, of the MR element during recording results in a voltage variation across the MR element, which leads to a variation of the control signal on the output 12.

The control signal generator 10 has a potentiometer 16 coupled between the input 11 and earth. The wiper of the potentiometer 16 is coupled to the inverting input of an amplifier 18 and, via a capacitor 23, to earth. A reference voltage $V_r$ is applied to the non-inverting input of the amplifier 18. This reference voltage $V_r$ serves to compensate for the d.c. component in the voltage across the resistance of the MR element 20 as a result of the measurement current $I_s$. The potentiometer serves to compensate for fabrication tolerances of the resistance value of the MR element 20. In this way it is achieved that a given resistance variation always leads to the same control signal on the output 12 of the generator 10. The sensitivity of the control signal generator 10 to variations in the voltage across the MR element 20 is determined by the wiper position and by the gain factor of the amplifier 18. The capacitor 23 is a smoothing capacitor.

The maximum fabrication tolerances of the resistance value of the MR element 20 may be, for example, a factor of 2. By adjusting the potentiometer 16 it can be achieved that in a nominal situation the voltage on the wiper of the potentiometer 16 is equal to $V_r$, so that no control signal appears on the output 12 of the generator 10. Moreover, a given nominal recording depth is required during recording. The nominal write current for which the required nominal recording depth is obtained should be adjusted depending on the characteristics of, inter alia, the write section. Since this adjustment for the nominal write current is a fine control, which is an order of magnitude smaller than the temperature variation control, it can also be effected by means of the potentiometer 16.

Measurements have shown that the thermal sensitivity of the resistance value of the MR element is 0.27% per °K. The maximum variation of the resistance value during readout of a magnetic record carrier appears to be 0.05%. This means that the magnetic sensitivity of the element presents hardly or no problem during the temperature measurement by means of the MR element 20. Moreover, the capacitor 23 ensures that possible voltage variations on the wiper of the potentiometer 16, which may be caused by the information read from the record carrier, are suppressed.

FIG. 2 shows diagrammatically a combined write-read head 30 for recording and reproducing an information signal in/from the same track on a record carrier.

Figure 2A:
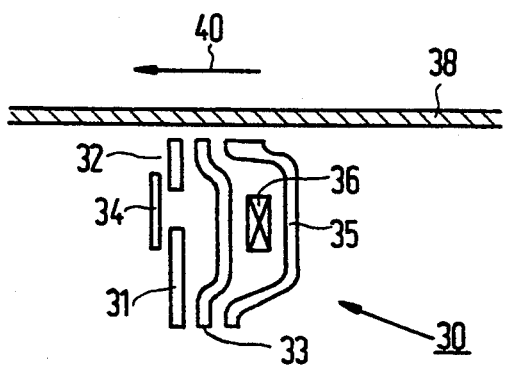
FIG. 2a shows a combined write-read head in a sectional view and FIG. 2b shows this head in a side view.

Such write-read heads have been described comprehensively in the literature, so that here only a brief description will be given. FIG. 2a is a sectional view of the magnetic head, taken at half the width of the track in the longitudinal direction of the track. The read section of the magnetic head 30 comprises flux guides 31, 32 and 33 and an MR element 34. The write section of the head has flux guides 33 and 35 and a coil, represented diagrammatically as an element 36. A record carrier 38 is moved past the magnetic head 30 in a direction indicated by an arrow 40.

Figure 2B:
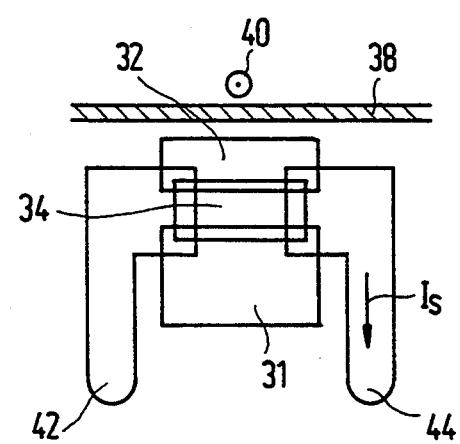

FIG. 2b is a view from the left in FIG. 2a and shows the flux guides 31 and 32, the MR element 34 and the electrical connections 42 and 44 of the MR element 34. Magnetic variations in the track lead to variations in the magnetic flux traversing the flux guides 31, 32 and 33 and the element 34. These flux variations lead to variations in the electrical resistance of the MR element 34 and, as a result of the current $I_s$ through the element 34, to voltage variations across the element. The read section is used as a temperature detector in a write mode of the device. Since the read section is in contact with the record carrier 38 and therefore has substantially the same temperature as the record carrier temperature variations in the record carder 38 result in temperature variations in the MR element 34, which leads to resistance variations of the element 34.

Figure 3:
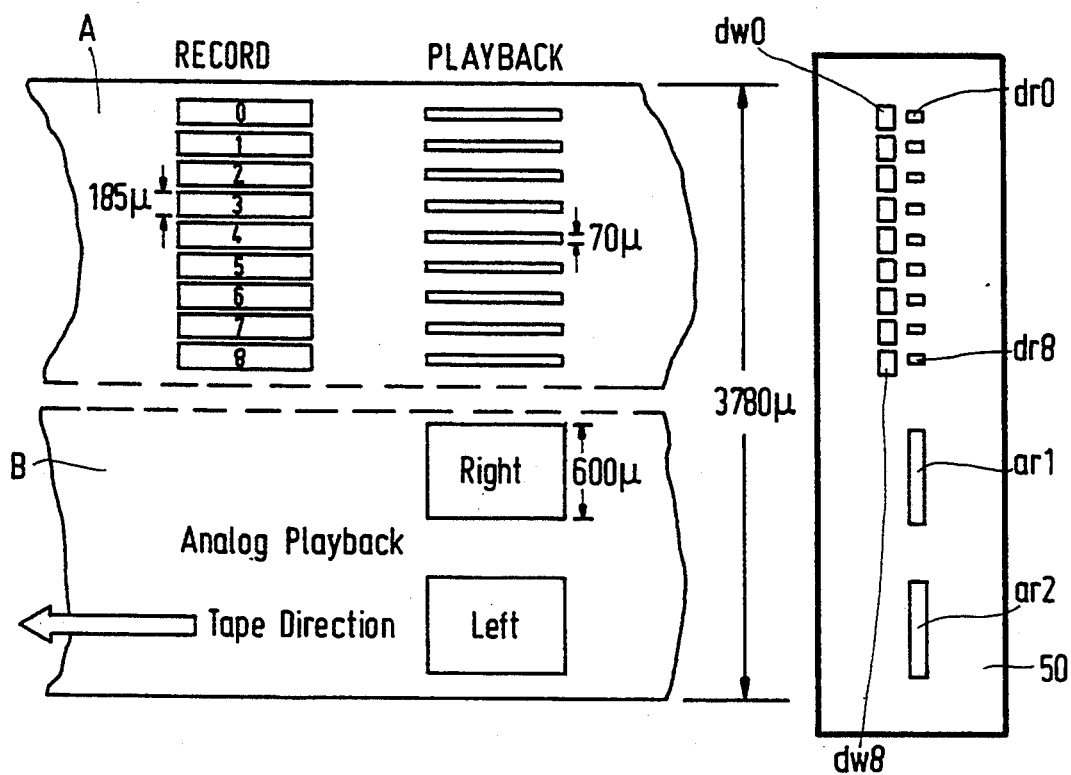
FIG. 3 shows a hybrid write-read unit for a recording and playback device of the DCC type, which is capable of recording and reproducing a digital information signal on/from a magnetic record carrier accommodated in a digital compact cassette, and of reproducing an analog audio signal from a magnetic record carrier accommodated in an analog compact cassette.

A combined write-read head as shown in FIG. 2 can be used, for example, in a write-read unit as employed in a recording and/or playback device of the DCC type. FIG. 3 shows diagrammatically such a write-read unit bearing the reference numeral 50. The write-read unit is of the hybrid type and is intended for use in devices of the DCC type, which are capable of recording on and playing back digital compact cassettes, and of playing back analog compact cassettes. For this purpose the write-read unit 50 comprises 9 combined write-read heads for recording and reading digital information, such as digital audio information and digital auxiliary information, in/from 9 tracks on one side, the A side or the B side, of a magnetic record carrier accommodated in a DCC cassette. The 9 write sections dw0 to dw8 are the elements of a large width and they write tracks of a large width, i.e. a width of 185 $\mu$m in the Figure, on one side, as the Figure for example shows for the side A of a DCC record carrier. The 9 read sections dr0 to dr8 are the portions of smaller width, i.e. a width of 70 $\mu$m. The write-read unit 50 further has two read sections referenced ar1 and ar2 for reading analog signals from an A side or B side, such as the side B in FIG. 3, of an analog compact cassette. A read section, such as ar1, may be of a construction similar to that of the read section of the head shown in FIG. 2a. Since ar1 is intended only for the reproduction of information the read section ar1 comprises only those elements of the head of FIG. 2a which are required for reading and does not comprise the elements required for writing. This means that the read section comprises flux guides 31, 32 and 33 and the MR element 34.

For controlling the write current to the digital write sections dw0 to dw8 in dependence upon temperature variations of the record career one of the analog read sections ar1 or ar2 is used as a temperature detector. Preferably, the read section nearest the write sections is used. In the present case this is the read section ar1. Furthermore, all the write sections and read sections should preferably be integrated in one constructional unit. The read section ar1 will then be capable of a better detection of the temperature at the location of writing in the record carder.

Figure 4:
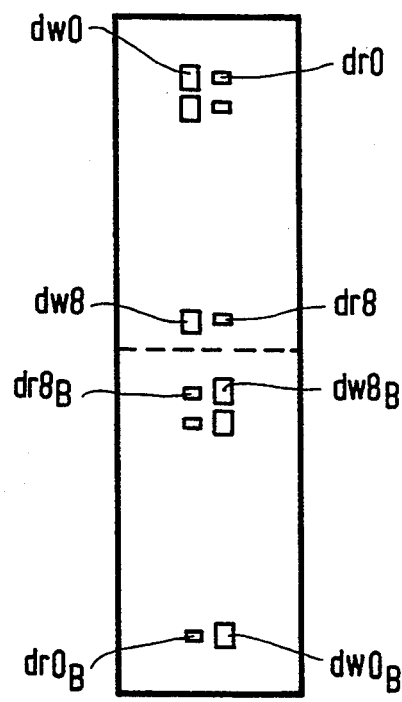
FIG. 4 shows another write-read unit for a DCC player.

A further use is in a write-read unit as shown in FIG. 4. This unit is intended for recording and reproducing digital information in a recording and playback device of the DCC type, the write-read unit being mounted stationarily. In order to record or reproduce a digital information signal on both sides of a magnetic record carrier accommodated in a digital compact cassette two sets of 9 write-read sections have been provided. For the A side these are the write sections dw0 to dw8 already shown in FIG. 3 and read sections dr0 to drS. Moreover, for the B side write sections $dw0_B$ to $dw8_B$ and read sections $dr0_B$ to $dr8_B$ have been provided. For the temperature-dependent control of the write currents for the write sections dw0 to dw8 the read section $dr8_B$ may be used as a temperature detector. For the temperature-dependent control of the write currents for the write sections $dwO_B$ to $dw8_B$ the read section dr8 may be used as a temperature detector.

The advantage is that in none of these cases a separate temperature detection element is needed.

We claim:

1. A device for recording an information signal on a magnetic record carrier, which device comprises
    an input terminal for receiving the information signal,
    a magnetic head having an input,
    a recording amplifier, having an input coupled to the input terminal and having an output coupled to the input of the magnetic head, for driving a magnetic head with a write current of given amplitude, and
    compensation means for controlling the amplitude of the write current in dependence upon temperature variations which occur during recording, which compensation means include temperature detection means, characterised in that:
    the magnetic head has a write section for recording the information signal on the magnetic record carrier in a recording mode of the device, and a read section for reading an information signal from the magnetic record carrier in a playback mode of the device, which read section comprises a magneto-resistive element, and in that the temperature detection means comprises the read section of the magnetic head.

2. A device as claimed in claim 1, characterised in that the compensation means detect the resistance value of the magneto-resistive element, said resistance value being a measure of the temperature of the magnetic head, to generate a control signal in dependence on said value, and to control the amplitude of the write current in dependence on the control signal.

3. A device as claimed in claim 2, characterised in that the write section includes means for recording the information signal in a first track on the magnetic record carrier in a recording mode of the device, and the read section includes means for reading an information signal from a second track of the magnetic record carrier in a playback mode of the device, and in that no information signal is recorded in the second track in said recording mode.

4. A device as claimed in claim 3, characterised in that the write section is integrated with the read section in one constructional unit.

5. A device as claimed in claim 3, characterised in that the write section includes means for recording an information signal in a track on a first side of the magnetic record carrier in a recording mode of the device, and the read section includes means for reading an information signal from a track on a second side of the magnetic record carrier in a playback mode of the device.

6. A device as claimed in claim 5, characterised in that the write section is adapted to record a digital information signal in the record carder, and the read section is adapted to read an analog information signal from the record carrier.

7. A device as claimed in claim 1, characterised in that the write section is integrated with the read section in one constructional unit.

8. A device as claimed in claim 1, characterised in that the write section includes means for recording the information signal in a first track on the magnetic record carrier in a recording mode of the device, and the read section includes means for reading an information signal from a second track of the magnetic record carrier in a playback mode of the device, and in that no information signal is recorded in the second track in said recording mode.

9. A device as claimed in claim 8, characterised in that the write section includes means for recording an information signal in a track on a first side of the magnetic record carrier in a recording mode of the device, and the read section includes means for reading an information signal from a track on a second side of the magnetic record carrier in a playback mode of the device.

10. A device as claimed in claim 9, characterised in that the write section includes means for recording a digital information signal in the record carrier, and the read section includes means for reading an analog information signal from the record carrier.

11. A device as claimed in claim 2, characterised in that the write section is integrated with the read section in one constructional unit.

* * * * *